United States Patent
Song et al.

(10) Patent No.: US 8,343,677 B2
(45) Date of Patent: Jan. 1, 2013

(54) METHOD OF RAPIDLY INCREASING INTERNAL TEMPERATURE OF A FUEL CELL STACK DURING STARTING OF FUEL CELL SYSTEM

(75) Inventors: Tae-won Song, Yongin-si (KR); Duk-jin Oh, Yongin-si (KR); Hyun-chul Lee, Yongin-si (KR); Dong-kwan Kim, Yongin-si (KR); Yong Wang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1216 days.

(21) Appl. No.: 11/870,608

(22) Filed: Oct. 11, 2007

(65) Prior Publication Data

US 2009/0035611 A1 Feb. 5, 2009

(30) Foreign Application Priority Data

Jan. 23, 2007 (KR) .................. 10-2007-0007237

(51) Int. Cl.
*H01M 8/06* (2006.01)
(52) U.S. Cl. ........ 429/437; 429/434; 429/433; 429/428; 429/429
(58) Field of Classification Search .............. 429/433, 429/434, 437, 428, 429
See application file for complete search history.

(56) References Cited

U.S. PATENT DOCUMENTS

| | | | |
|---|---|---|---|
| 6,379,827 B1 * | 4/2002 | Cipollini | 429/429 |
| 2004/0142217 A1 * | 7/2004 | Couch et al. | 429/13 |
| 2005/0175875 A1 * | 8/2005 | Nelson et al. | 429/26 |
| 2006/0240298 A1 * | 10/2006 | Yamada et al. | 429/24 |

* cited by examiner

*Primary Examiner* — Zachary Best
(74) *Attorney, Agent, or Firm* — Stein McEwen, LLP

(57) ABSTRACT

A method of starting a polymer electrolyte membrane fuel cell (PEMFC) stack by rapidly increasing its temperature. The PEMFC stack includes: a first flow line connected to cooling plates; a second flow line connected to the cooling plates; a coolant reservoir; a heat exchanger; a by-pass line; a heating element; a first valve installed between the first flow line and the heat exchanger; and a second valve that selectively connects the coolant reservoir, the second flow line, and the by-pass line. The method of starting a PEMFC stack includes: closing the first valve and controlling the second valve so that the second flow line and the by-pass line are connected to each other, and the coolant in the coolant reservoir is not connected to the second flow line and the by-pass line; and heating the coolant in the by-pass line.

16 Claims, 6 Drawing Sheets

METHOD OF RAPIDLY INCREASING INTERNAL TEMPERATURE OF A FUEL CELL STACK DURING STARTING OF FUEL CELL SYSTEM

CROSS-REFERENCE TO RELATED APPLICATIONS

This application claims the benefit of Korean Application No. 2007-7237, filed Jan. 23, 2007, in the Korean Intellectual Property Office, the disclosure of which is incorporated herein by reference.

BACKGROUND OF THE INVENTION

1. Field of the Invention

Aspects of the present invention relate to a fuel cell, a fuel cell system, and a method of operating the same.

2. Description of the Related Art

A fuel cell is an electricity generation device that directly converts the chemical energy of hydrogen, included in a hydrocarbon material, such as, methanol, ethanol, or natural gas, into electrical energy through a chemical reaction with oxygen.

A polymer electrolyte membrane fuel cell (PEMFC) has a wide range of applications, for example, as a power source for automobiles, as a distributional power source for houses or public buildings, and as a small power source for electronic devices. A PEMFC has a superior power output, as compared to other fuel cells, a low operating temperature, a rapid start-up, and a short response time.

A conventional PEMFC mainly operates at a temperature below 100° C., for example, at approximately 80° C., to prevent the drying of a polymer electrolyte membrane included therein. However, a conventional PEMFC has problems, due to the low operating temperature of approximately 100° C., or less. For example, a conventional PEMFC uses a hydrogen-rich gas as a fuel, which is obtained by reforming an hydrocarbon containing material, such as, natural gas or methanol, which produces $CO_2$ and CO as by-products. The CO poisons a catalyst included in a cathode and anode of a conventional PEMFC. When the catalyst is poisoned by CO, an electrochemical activity of the catalyst is greatly reduced, and as a result, the operation efficiency and lifetime of the PEMFC are significantly reduced. Furthermore, as the operating temperature of a conventional PEMFC is decreased, the catalyst poisoning by the CO is increased.

A conventional high temperature PEMFC operates at a higher operating temperature of, for example, approximately 130° C., or higher, in order to reduce the poisoning of the catalyst by CO, and to allow for easier temperature control thereof. However, a conventional high temperature PEMFC requires a cooling system to cool a fuel cell stack thereof. The cooling system mainly uses de-ionized water as a coolant.

In a conventional high temperature PEMFC that uses a coolant, an internal temperature of a fuel cell stack must be brought to, for example, 120° C., when the fuel cell stack begins operation. To do this, the coolant that passes through the fuel cell stack must also be heated. However, due to the time required for the coolant to be heated, the normal operation of the PEMFC is delayed.

SUMMARY OF THE INVENTION

Aspects of the present invention provide a method to rapidly increase an internal temperature of a fuel cell stack of a fuel cell system, during a start-up (preheating) operation of the fuel cell system.

According to aspects of the present invention, there is provided a method of preheating a polymer electrolyte membrane fuel cell (PEMFC) stack of a fuel cell system. The fuel cell system comprises: a first flow line that is connected to upper parts of cooling plates installed in a plurality of unit cells of the PEMFC stack; a second flow line that is connected to lower parts of the cooling plates; a coolant reservoir installed between the first flow line and the second flow line; a heat exchanger installed between the first flow line and the coolant reservoir; a by-pass line that connects a point between the coolant reservoir and the second flow line, to the first flow line; a heating element that heats coolant in the by-pass line; a first valve installed between the first flow line and the heat exchanger; and a second valve that selectively connects the coolant reservoir, the second flow line, and the by-pass line According to various embodiments, the method comprises: closing the first valve and controlling the second valve so that coolant in the second flow line can flow to the by-pass line, and so that coolant in the coolant reservoir cannot flow to the second flow line or the by-pass line; and increasing the temperature of the PEMFC stack, by heating the coolant in the by-pass line using the heating element. The method may further comprise opening the first valve and controlling the second valve, so that the second flow line is opened to the coolant reservoir, if the temperature of the PEMFC stack is increased to a predetermined temperature, or higher.

According to some embodiments, the second valve V2 may be a 3-way valve that selectively allows the coolant to flow between the coolant reservoir, the second flow line, and the by-pass line. The heating element may be a burner or an electric heater.

According to other aspects of the present invention, there is provided a method of preheating a PEMFC stack of a fuel cell system. The fuel cell system comprises: a first flow line that is connected to upper parts of cooling plates installed in a plurality of unit cells of the PEMFC stack; a second flow line that is connected to lower parts of the cooling plates; a coolant reservoir installed between the first flow line and the second flow line; a heat exchanger installed between the first flow line and the coolant reservoir; a by-pass line that connects a point between the coolant reservoir and the second flow line, to the first flow line; a heating element that heats coolant in the by-pass line; a third valve connected to the coolant reservoir, to discharge coolant to the outside; and a fourth valve connected to a coolant supply line, to control a flow of coolant to the coolant reservoir from the coolant supply line.

According to some aspects of the present teachings, the method comprises: opening the third valve, in order to discharge the coolant in the coolant reservoir to the outside; and increasing the temperature of the PEMFC stack by operating the heating element. The method may further comprise supplying coolant to the coolant reservoir by opening the fourth valve, when the temperature of the PEMFC stack reaches a predetermined temperature, or higher. The fourth valve may be located at a position higher than the coolant reservoir.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
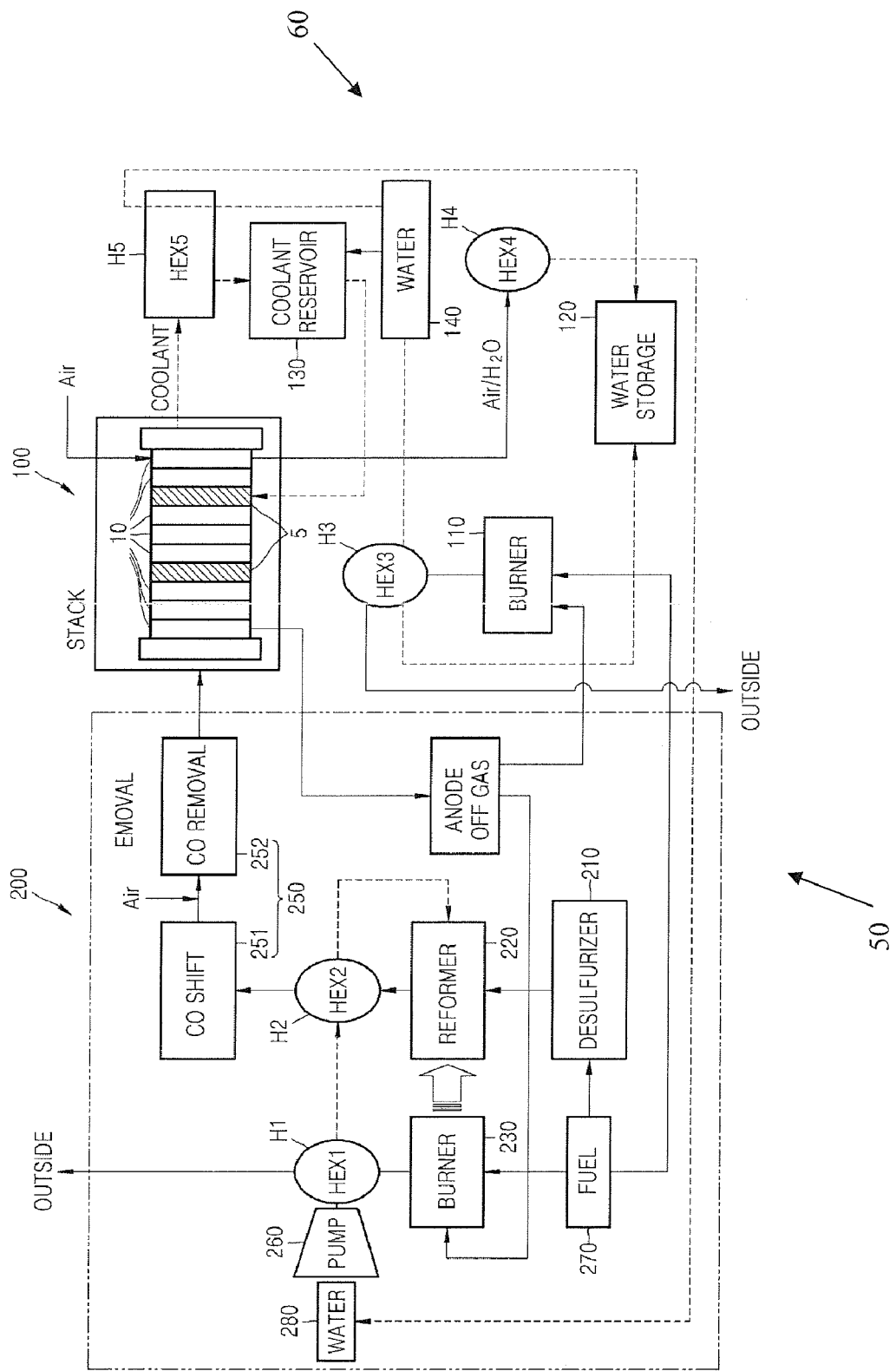
FIG. 1 is a block diagram of a fuel cell system, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a fuel cell system 50, according to an exemplary embodiment of the present invention. Referring to FIG. 1, the fuel cell system 50 includes a fuel processor 200, a polymer electrolyte membrane fuel cell (PEMFC) stack 100, and a cooling system 60 to cool the PEMFC stack 100.

The fuel processor 200 includes a desulfurizer 210, a reformer 220, a burner 230, a water supply pump 260, first and second heat exchangers H1 and H2, and a carbon monoxide (CO) removing unit 250. The CO removing unit 250 comprises a CO shift reactor 251 and a CO remover 252.

Hydrogen is generated in the reformer 220, which is heated by the burner 230 through a chemical reaction between a hydrocarbon containing gas, which is a fuel source supplied from a fuel tank 270, and steam, which is supplied from a water tank 280 by the water supply pump 260. $CO_2$ and CO are generated as by products from the chemical reaction. If a fuel containing 10 ppm, or more, of the CO is supplied to the PEMFC stack 100, catalysts of electrodes of the PEMFC stack 100 become poisoned, resulting in a rapid reduction in the performance of the fuel cell system 50. Therefore, the content of the CO in the fuel supplied to the PEMFC is reduced to 10 ppm, or less, by installing the CO shift reactor 251 and the CO remover 252 at an outlet of the reformer 220. The $CO_2$ is mainly produced in the CO shift reactor 251 by a chemical reaction between the CO and the steam. An oxidation reaction between the CO and oxygen mainly occurs in the CO remover 252.

The desulfurizer 210, installed at the inlet of the reformer 220, removes sulphur components included in the fuel source. In the first and second heat exchangers H1 and H2, the water supplied by the water supply pump 260 absorbs heat from a combustion gas exhausted from the burner 230 and the reformer 220.

Figure 2:
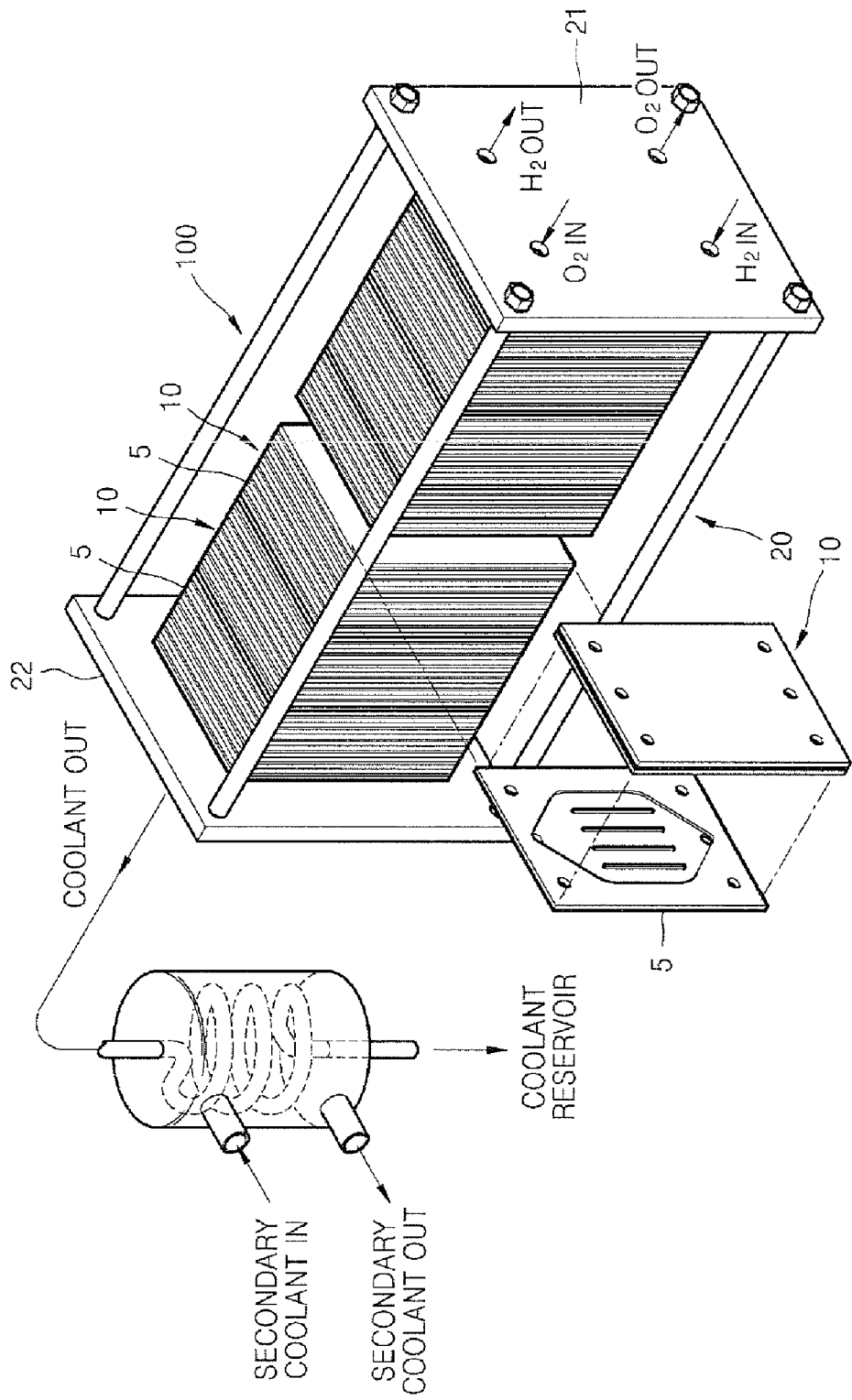
FIG. 2 is a perspective view of a portion of a cooling system of a fuel cell stack of the fuel cell system of FIG. 1, according to an exemplary embodiment of the present invention.
Figure 3:
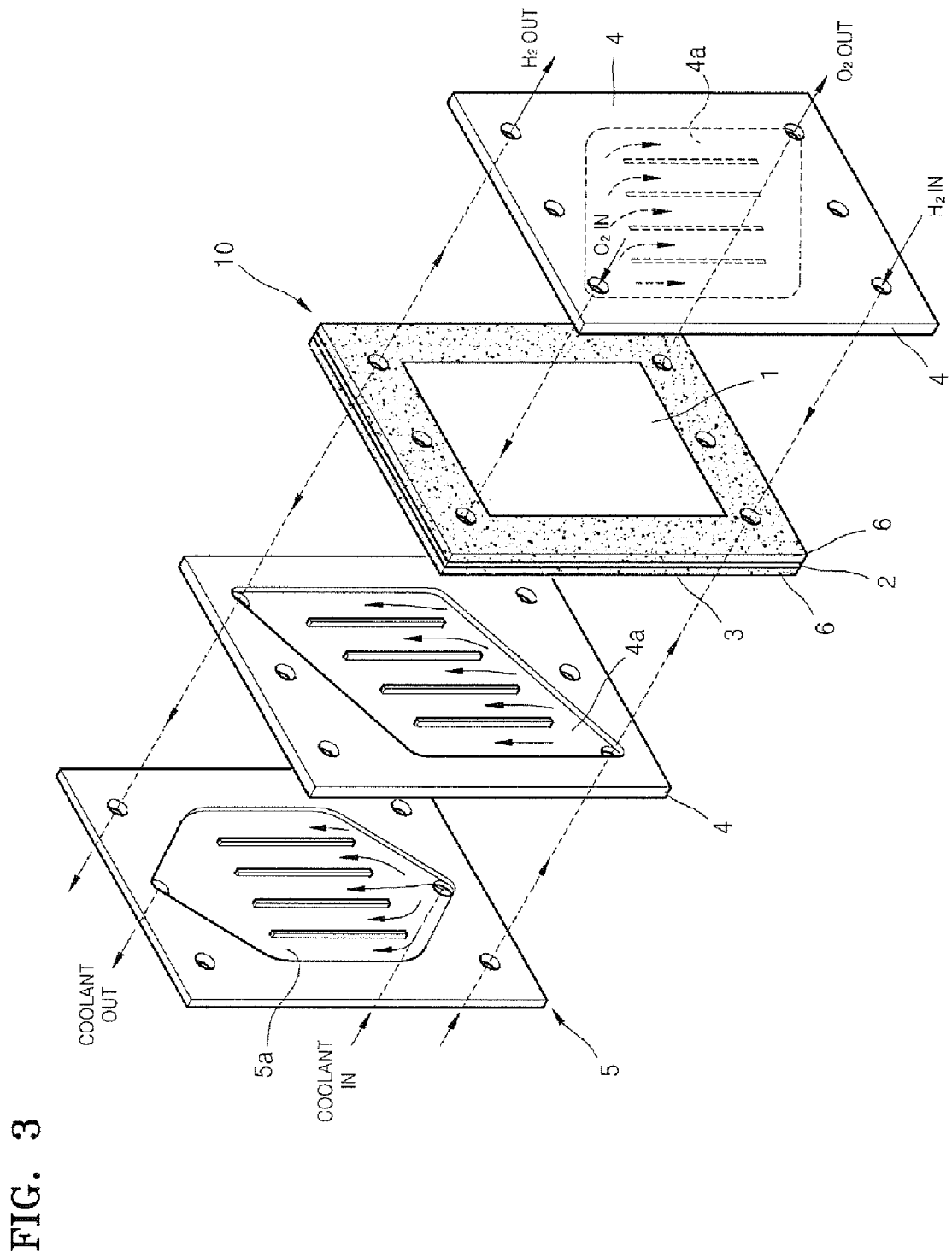
FIG. 3 is an exploded perspective view of the flow of a fluid between the cooling plate and the unit cells of the fuel cell stack of FIG. 2, according to an exemplary embodiment of the present invention.

FIG. 2 is a perspective view of a portion of a portion of the cooling system 60 of the fuel cell stack 100, according to an exemplary embodiment of the present invention, and FIG. 3 is an exploded perspective view of the flow of a fluid between a cooling plate 5 and unit cells 10 of the PEMFC stack 100, of FIG. 2, according to an exemplary embodiment of the present invention.

Referring to FIGS. 2 and 3, the unit cells 10 are stacked in the PEMFC stack 100. Each of the unit cells 10 includes an electrolyte membrane 2, and a cathode electrode 1, an anode electrode 3, and an electrolyte membrane 2 disposed therebetween. Separators 4, having flow channels 4a to supply an oxidant or hydrogen gas to the cathode and anode electrodes 1 and 3, are installed between the unit cells 10. Gaskets 6 to seal each of the unit cells 10 are installed between the cathode and anode electrodes 1 and 3, and between the separators 4.

The PEMFC stack 100 includes a plurality of cooling plates 5 and a heat exchanger H5 (refer to FIG. 1). The cooling plates 5 channel a coolant through the PEMFC stack 100. One cooling plate 5 is disposed on each of the unit cells 10. For example, a cooling plate 5 can be disposed between each of the unit cells 10. The coolant absorbs heat from the PEMFC stack 100, by passing through flow channels 5a of the cooling plate 5. The heated coolant is cooled in the heat exchanger H5, by a secondary coolant. Afterwards, the coolant from the heat exchanger H5 is re-circulated in the PEMFC stack 100, via a coolant reservoir 130 (refer to FIG. 1).

End plates 21 and 22 are respectively installed on opposing ends of the PEMFC stack 100. An oxygen (air) supply hole, an oxygen (air) recovery hole, a fuel (hydrogen gas) supply hole, and a fuel (hydrogen gas) recovery hole are formed in the end plate 21. A coolant supply hole and a coolant recovery hole are formed in the end plate 22. Each of the cooling plates 5, the unit cells 10, and the separators 4 includes the coolant supply and recovery holes, the oxygen (air) supply and recovery holes, and the fuel (hydrogen) supply and recovery holes. The fuel (air, and hydrogen gas) or the coolant is supplied and discharged through the respective above-described holes.

Referring to FIG. 1, a coolant stored in the coolant reservoir 130 is supplied to the cooling plates 5 in the PEMFC stack 100, in a liquid state, and exits the PEMFC stack 100 in a vapour state, after absorbing heat in the PEMFC stack 100. The coolant is cooled through a heat exchange, in the heat exchanger H5, with the secondary coolant supplied from a water tank 140 (refer to FIG. 1). The coolant is stored in the coolant reservoir 130. A process burner 110 may use surplus hydrogen that is not consumed in the anode electrode 3 of the PEMFC stack 100, and/or may use a fuel supplied from the fuel tank 270 during a normal operation state of the PEMFC stack 100. The process burner 110 heats the water supplied from the water tank 140 at a heat exchanger H3. Water heated by the process burner 110 is guided to a warm water storage 120.

Air is supplied to the cathode electrodes 1 of the PEMFC stack 100. A mixture of air and steam is guided to a heat exchanger H4, where the steam is condensed into water, which is recovered in the water tank 280.

Figure 4:
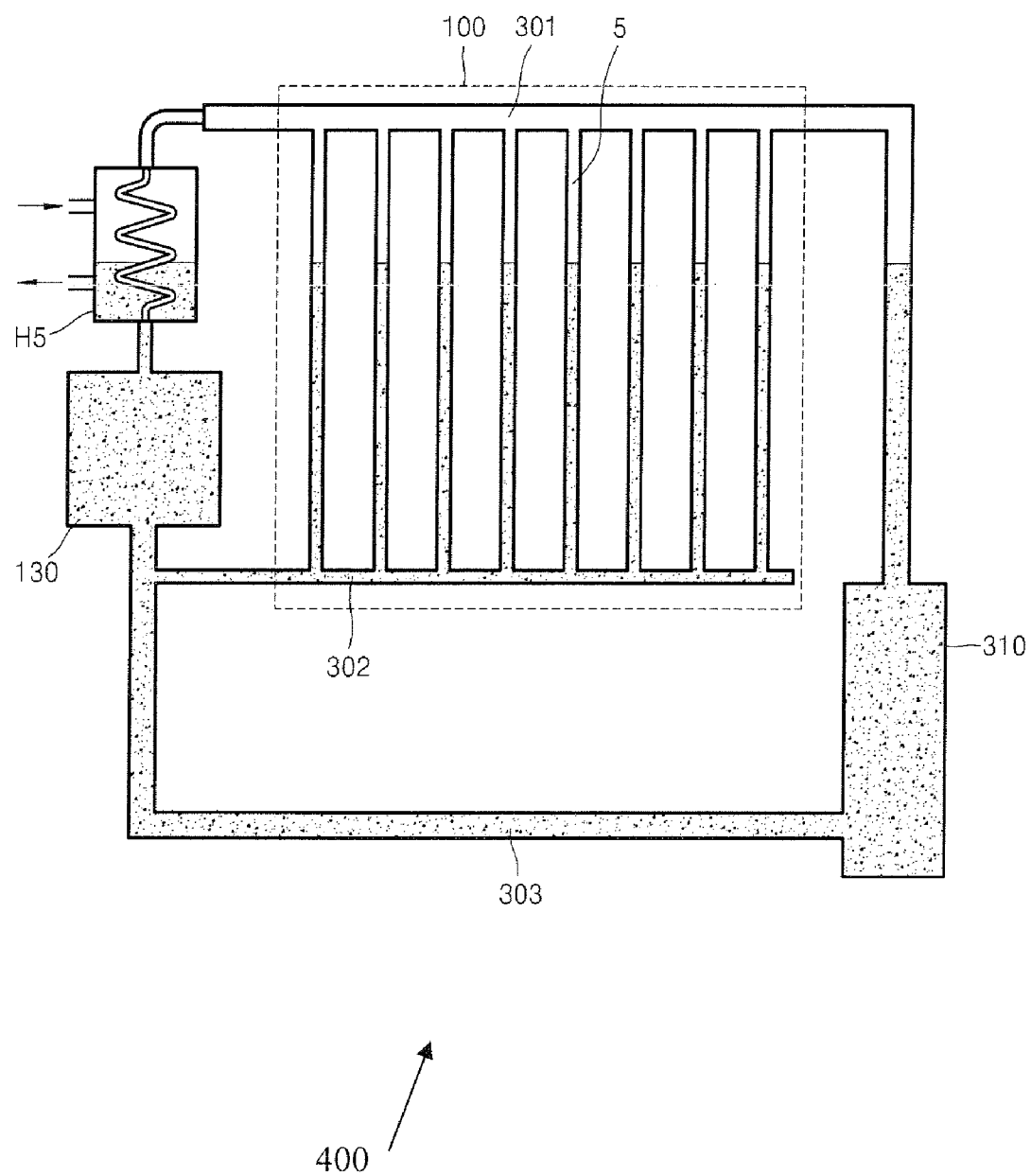
FIG. 4 is a schematic drawing of a cooling system having a heating device for initially heating the fuel cell stack of the fuel cell system of FIG. 1, according to an exemplary embodiment of the present invention.

FIG. 4 is a schematic drawing of a cooling system 400, including a heating element 310 to preheat the PEMFC stack 100, according to an exemplary embodiment of the present invention. Like reference numerals are used to indicate elements that are substantially identical to the elements of FIGS. 1 through 3, and thus, the detailed description thereof will not be repeated.

Referring to FIG. 4, for convenience of explanation, the cooling plates 5 of the PEMFC stack 100 are simplified, by omitting the unit cells 10 disposed between the cooling plates 5. A first flow line 301 that passes by the upper parts of the cooling plates 5 is a flow line to channel a cooling medium (coolant) that exits the cooling plates 5. A second flow line 302 is connected to the lower parts of the cooling plates 5, and is a flow line to channel the cooling medium than enters the PEMFC stack 100. The first flow line 301 is connected to the coolant reservoir 130 and the heat exchanger H5. The second flow line 302 is connected to the coolant reservoir 130, in order to receive coolant. The heat exchanger H5 can cool the coolant received from the first flow line 301, using a secondary coolant other than the coolant that circulates in the PEMFC stack 100, for example, the water from the water tank 140. The coolant can be deionized (DI)

A heating element 310, for example, an electric heater, is connected to the coolant reservoir 130. The heating element 310 preheats the PEMFC stack 100 to a predetermined temperature, for example, 120° C., when the fuel cell system 50 is started. The heating element 310 installed in a by-pass line 303, disposed between the coolant reservoir 130 and the first flow line 301. The by-pass line 303 is used for the preheating when the fuel cell system 50 is started.

In order to rapidly heat the PEMFC stack 100, using the heating element 310, the capacity of the heating element 310 can be increased. However, in this case, the loss of electricity is large. Also, in order to reduce a volume of the coolant, the capacity of the coolant reservoir 130 can be reduced. However, a minimum capacity of the coolant reservoir 130 should be maintained.

For example, if the capacity of the coolant reservoir 130 is 500 ml, and the rated power consumption of the heating element 310 (electric heater) is 500 W, it takes approximately 15 minutes to raise the temperature of all of the coolant in the coolant reservoir 130, from room temperature to 120° C., using the heating element 310. Also, if a total amount of coolant, except the coolant in the coolant reservoir 130, is 750 ml, it takes approximately 23 minutes to increase the temperature of the PEMFC stack 100, by heating all of the coolant in the cooling system 400. This can lead to a delay in the start-up operation of the fuel cell system.

Figure 5:
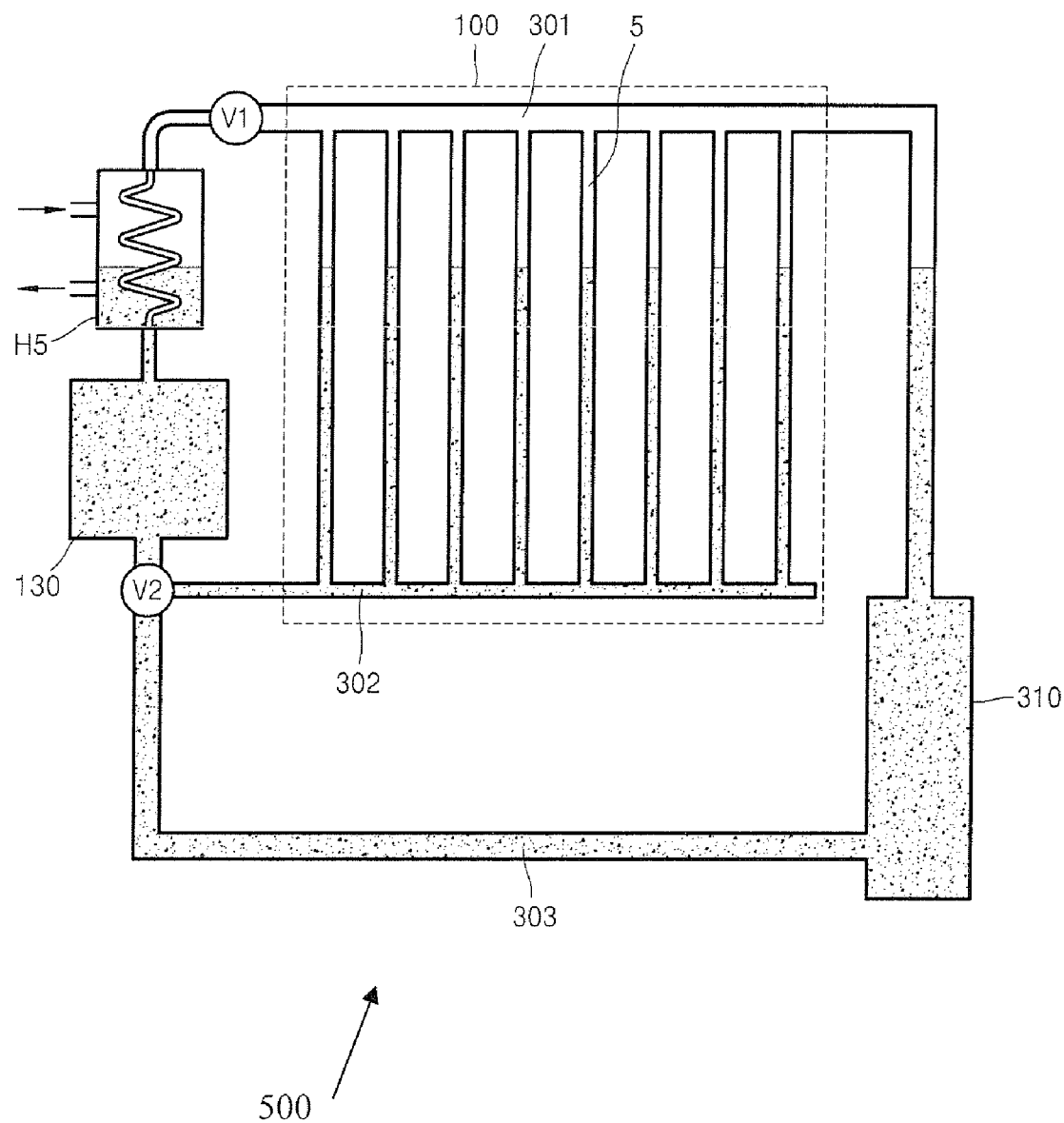
FIG. 5 is a schematic drawing of a cooling system, to which a method of starting a fuel cell stack, according to an exemplary embodiment of the present invention is employed.

FIG. 5 is a schematic drawing of a cooling system 500, to which a method of starting (preheating) a fuel cell stack, according to an exemplary embodiment of the present invention, is employed. Referring to FIG. 5, a first valve V1 is installed between the first flow line 301, which is connected to the upper parts of the cooling plates 5, and the heat exchanger H5. A second valve V2, which is a 3-way valve, is installed in the by-pass line 303. The second valve V2 has a first position to allow the coolant flow from the coolant reservoir 130 to the second flow line 302 (a first position). The second valve V2 has a second position to open the second flow line 302 to the by-pass line 303 (a second position), while blocking the coolant from flowing from the coolant reservoir 130 to the second flow line 302. The first valve V1 controls a flow rate of the coolant.

A method of heating the PEMFC stack 100, for starting-up of the fuel cell system, will now be described. Firstly, the first valve V1 is closed and the second valve V2 is set to the second position. In this case, the coolant in the coolant reservoir 130 is blocked from entering the by-pass line 303 and the second flow line 302. Accordingly, an amount of the coolant heated by the electric heater 310 is reduced, and a time required to preheat the PEMFC stack 100 is reduced. For example, the time required can be reduced by approximately 15 minutes, when an amount of coolant stored in the coolant reservoir 130 is 500 ml, and the rated power consumption of the heating element 310 is 500 W.

If the coolant in the by-pass line 303 is heated using the heating element 310, a portion of the coolant is vaporized and moves upward into the first flow line 301. The coolant in the first flow line 301 is blocked by the first valve V1 and heats the cooling plates 5, while passing through the flow channels 5a of the cooling plates 5. The coolant in the flow channels 5a moves to the second flow line 302, then to the by-pass line 303 through the second valve V2, then to the heating element 310, where the coolant is heated. The heated coolant is then re-circulated to the cooling plates 5. The temperature of the PEMFC stack 100 is increased to an operating temperature, due to the circulation of the coolant, and the fuel cell system can be started, in accordance with an operation condition of the CO shifter 251.

After the PEMFC stack 100 is preheated to the operating temperature, the first valve V1 is opened, and the second valve V2 is adjusted from the second position to the first position, in a stepwise fashion. Thus, the by-pass line 303 is closed, and the coolant circulates between the coolant reservoir 130 and the cooling plates 5. The stepwise adjustment of the second valve V2 controls the flow rate of coolant entering the PEMFC stack 100. Thus, the PEMFC stack 100 can be switched to a normal operation. In the normal operation of the PEMFC stack 100, the second valve V2 is adjusted to the first position.

The heating element 310 can be, for example, a burner, and thus, the present invention is not limited to the heating element 310 being an electric heater. The second valve V2 may be a 3-way valve, however, the present invention is not limited thereto. For example, a valve (not shown) can be installed between the coolant reservoir 130 and the second flow line 302 and another valve (not shown) can be installed between the coolant reservoir 130 and the by-pass line 303, as long as similar results can be obtained.

Figure 6:
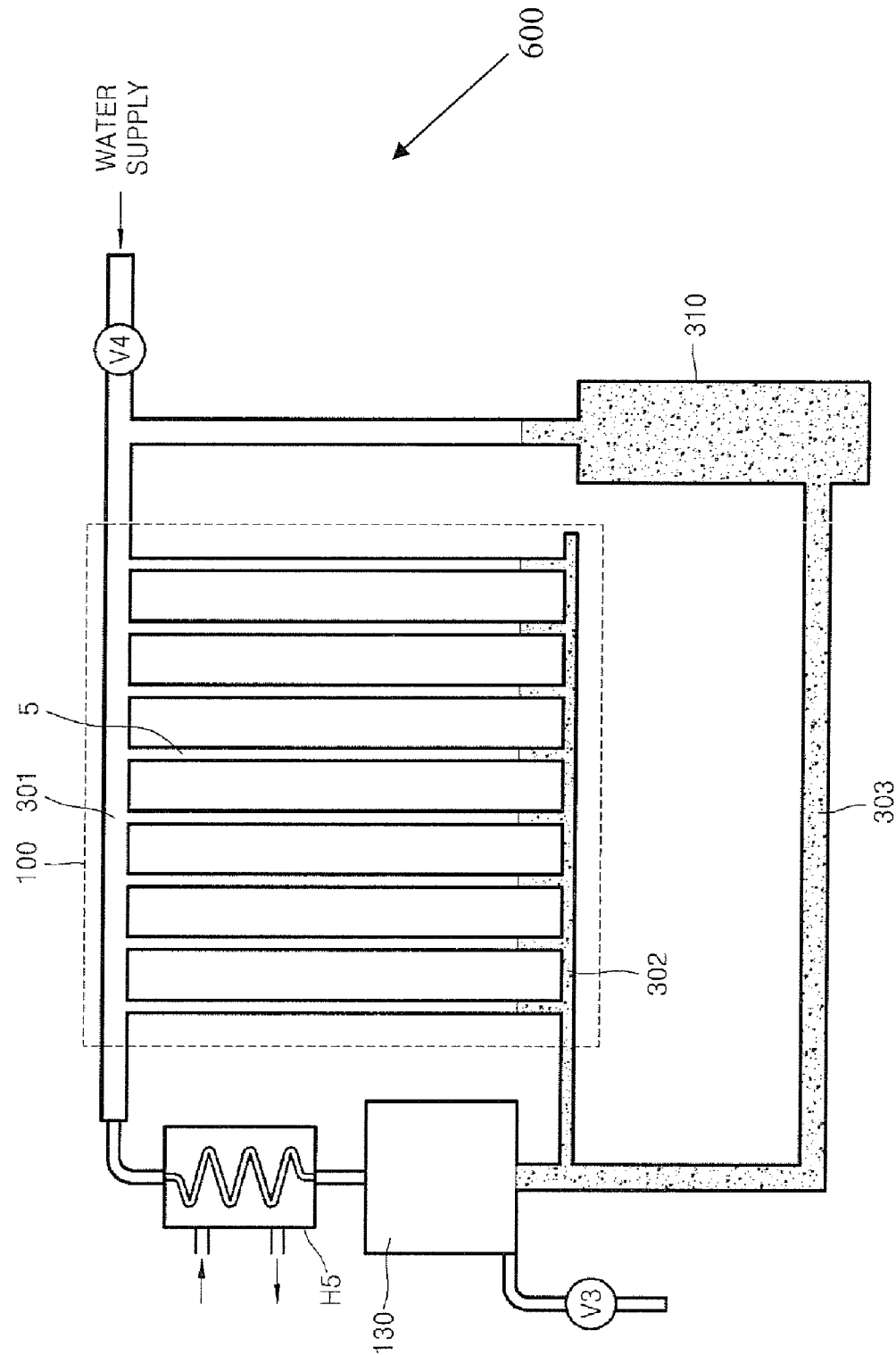
FIG. 6 is a schematic drawing of a cooling system, to which a method of starting a fuel cell stack, according to an exemplary embodiment of the present invention is employed.

FIG. 6 is a schematic drawing of a cooling system 600, to which a method of starting (preheating) a fuel cell stack, according to another exemplary embodiment of the present invention, is employed. Referring to FIG. 6, a third valve V3, to control the discharge of the coolant to the outside, is installed on the coolant reservoir 130, and a fourth valve V4, to control a flow of the coolant from the outside, is installed on the first flow line 301. Except for the third and fourth valves V3 and V4, the rest of the elements in FIG. 6 are substantially identical to the elements in FIG. 5, and thus, like reference numerals are used in FIGS. 5 and 6 and the detailed descriptions thereof, will not be repeated. The fourth valve V4 may control a flow rate of the coolant.

A method of heating the PEMFC stack 100, for starting up (preheating) the fuel cell system, will now be described. The fourth valve V4 closed, and the coolant in the coolant reservoir 130 is discharged to the outside, by opening the third valve V3. After the coolant is discharged from the reservoir 130, the third valve V3 is closed. Accordingly, the amount of coolant to be heated by the heating element 310 is reduced, and the time required to increase the temperature of the PEMFC stack 100 can be reduced.

When the coolant in the by-pass line 303 is heated using the heating element 310, the temperature of the coolant rises, and a portion of the coolant turns into vapor. The vapor moves to the first flow line 301. A portion of the heated coolant in the first flow line 301 moves to the coolant reservoir 130, and the rest of the heated coolant heats the cooling plates 5, while the heated coolant flows through the flow channels 5a of the cooling plates 5. The coolant in the flow channels 5a of the cooling plates 5 flows down the second flow line 302, to the by-pass line 303, and then from the by-pass line to the heating element 310. The coolant is heated in the heating element 310, flows to the PEMFC stack 100, and is then circulated therein. Due to the circulation of the coolant as described above, the temperature of the PEMFC stack 100 increases to an operating temperature, and the fuel cell system can be started, in accordance with the operating condition of the CO shifter 251.

When the PEMFC stack 100 is preheated to the operating temperature, the fourth valve V4, which is connected to a coolant supply line, is opened. The coolant can then flow to the coolant reservoir 130, via the by-pass line 303. At this point, an amount of coolant that is supplied through the fourth valve V4 may be appropriately controlled. Since the fourth valve V4 is located at a higher position than the coolant reservoir 130, the coolant can be supplied to the coolant reservoir 130, due to hydraulic pressure. If the fourth valve V4 is located at a lower position than the coolant reservoir 130, an additional pump may be used.

As described above, in a method of starting (preheating) a PEMFC stack, according to aspects of the present invention, the amount of coolant that is to be heated using a heating element is reduced, the temperature of the PEMFC stack can be rapidly increased, and the time required for a fuel cell system to be started (preheated) can be reduced. The exemplary method of starting the PEMFC stack can be realized by installing two additional valves. Accordingly, this modification can be achieved in a conventional system with a minimum cost.

Although a few embodiments of the present invention have been shown and described, it would be appreciated by those skilled in the art that changes may be made in this embodiment without departing from the principles and spirit of the invention, scope of which is defined in the claims and their equivalents.

What is claimed is:

1. A method of starting a fuel cell system that comprises: a polymer electrolyte membrane fuel cell (PEMFC) stack comprising unit cells and coolant plates to cool the unit cells; a first flow line that passes through gravitationally upper parts of the cooling plates; a second flow line that passes through gravitationally lower parts of the cooling plates; a heat exchanger and a coolant reservoir sequentially connected between an outlet of the first flow line and an inlet of the second flow line; a first valve installed between the coolant reservoir and the inlet of the second flow line; a by-pass line that is connected between a second valve and an inlet of the first flow line, the second valve selectively controlling a coolant flow from the coolant reservoir to the second flow line or the by-pass line; a heating element installed on the bypass line to heat coolant in the by-pass line; the method comprising:
    closing the first valve and controlling the second valve so that coolant can flow from the second flow line to the by-pass line through the second valve, and the coolant in the coolant reservoir cannot flow to the second flow line or the by-pass line; and
    increasing the temperature of the PEMFC stack by heating the coolant in the by-pass line using the heating element and flowing the coolant from the by-pass line to sequentially pass through the first flow line and the PEMFC stack,
    wherein the coolant passes through the second flow line, the coolant plates, the first flow line, the heat exchanger, and the coolant reservoir in this order during a normal operation of the fuel cell system, and
    the coolant passes through the by-pass line, the first flow line, the cooling plates, and the second flow line in this order during a starting operation of the fuel cell system.

2. The method of claim 1, further comprising opening of the first valve and controlling the second valve so that the coolant in the coolant reservoir flows to the second flow line, if the temperature of the PEMFC stack is at least a predetermined temperature.

3. The method of claim 1, wherein the second valve is a 3-way valve that selectively connects two of the coolant reservoir, the second flow line, and the by-pass line.

4. The method of claim 1, wherein the heating element is a burner or an electric heater.

5. A method of starting a fuel cell system that comprises: PEMFC stack comprising unit cells and coolant plates to cool the unit cells; a first flow line passes through gravitationally upper parts of the cooling plates; a second flow line that passes through gravitationally lower parts of the cooling plates; a heat exchanger and a coolant reservoir sequentially connected between an outlet of the first flow line and an inlet of the second flow line; a third valve connected to the coolant reservoir to control a discharge of a coolant from the coolant reservoir to an outside of the fuel cell system; a by-pass line that is connected between the coolant reservoir and an inlet of the second flow line and connected to an inlet of the first flow line; a heating element that is installed on the by-pass line to heat coolant in the by-pass line; and a fourth valve installed on a coolant supply line to control the supply of the coolant into the inlet of the first flow line, the method comprising:
    opening the third valve and discharging the coolant in the coolant reservoir out of the fuel cell system; and
    increasing the temperature of the PEMFC stack by heating the coolant in the by-pass line using the heating element, and flowing the coolant in the by-pass line to sequentially pass through the first flow line and the PEMFC stack,
    wherein the coolant passes through the second flow line, the coolant plates, the first flow line, the heat exchanger, and the coolant reservoir in this order during a normal operation of the fuel cell system, and
    the coolant passes throuqh the by-pass line, the first flow line, the cooling plates, the second flow line in this order during a starting operation of the fuel cell system.

6. The method of claim 5, further comprising supplying coolant to the coolant reservoir by opening the fourth valve, if the temperature of the PEMFC stack is at least a predetermined temperature.

7. The method of claim 5, wherein the fourth valve is located at a position of higher potential energy than the coolant reservoir.

8. The method of claim 5, wherein the heating element is a burner or an electric heater.

9. The method of claim 1, wherein the increasing of the temperature further comprises preventing the coolant in the coolant reservoir from being heated by the heating element.

10. The method of claim 1, further comprising circulating the coolant between the heating element and the PEMFC stack.

11. The method of claim 10, wherein the circulating of the coolant further comprises flowing the coolant from the PEMFC stack through the second flow line, to the heating element.

12. The method of claim 2, wherein the predetermined temperature is an operating temperature of the PEMFC stack.

13. The method of claim 5 further comprising, closing the third and fourth valves before the flowing of the coolant.

14. The method of claim 6, wherein the predetermined temperature is an operating temperature of the PEMFC stack.

15. The method of claim 5, further comprising closing the third and fourth valves before the increasing of the temperature.

16. The method of claim 5, further comprising circulating the coolant between the heating element and the PEMFC stack.

* * * * *